(12) United States Patent
Katsuyama (10) Patent No.: US 9,457,804 B2
(45) Date of Patent: Oct. 4, 2016

(54) VEHICLE BRAKING/DRIVING FORCE CONTROL APPARATUS

(71) Applicant: TOYOTA JIDOSHA KABUSHIKI KAISHA, Toyota-shi, Aichi (JP)

(72) Inventor: Etsuo Katsuyama, Hiratsuka (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/505,075

(22) Filed: Oct. 2, 2014

(65) Prior Publication Data

US 2015/0100205 A1 Apr. 9, 2015

(30) Foreign Application Priority Data

Oct. 3, 2013 (JP) .................................. 2013-208102

(51) Int. Cl.
*B60W 30/04* (2006.01)
*B60W 10/08* (2006.01)
(Continued)

(52) U.S. Cl.
CPC ................. *B60W 30/04* (2013.01); *B60L 3/10* (2013.01); *B60L 3/102* (2013.01); *B60L 7/00* (2013.01);
(Continued)

(58) Field of Classification Search
CPC .. B60W 30/04; B60W 10/192; B60W 10/08; B60W 10/22; B60W 2030/043; B60W 30/18172; B60W 30/045; B60W 10/184; B60W 2710/083; B60W 2050/0024; B60W 2720/30; B60W 2710/182; B60W 2720/14; B60W 2720/16; B60W 2720/18; B60W 2520/26; B60L 3/10; B60L 7/00; B60L 15/2009; B60L 3/102; B60L 15/20; B60L 2220/46; Y02T 10/72; Y02T 10/645; Y02T 10/7275; B60K 7/0007

USPC ............................................................ 701/37
See application file for complete search history.

(56) References Cited

U.S. PATENT DOCUMENTS

| 5,376,868 A | * | 12/1994 | Toyoda | B60L 3/00 318/52 |
| 2012/0109484 A1 | * | 5/2012 | Onoda | B60T 8/1706 701/72 |
| 2013/0218388 A1 | | 8/2013 | Katsuyama | |

FOREIGN PATENT DOCUMENTS

| JP | 2007-131212 A | 5/2007 |
| JP | 2007-161032 A | 6/2007 |

(Continued)

*Primary Examiner* — Brian P Sweeney
(74) *Attorney, Agent, or Firm* — Sughrue Mion, PLLC (57) ABSTRACT

Provided is a vehicle braking/driving force control apparatus for securing travel stability of a vehicle by priority when a slip occurs on a wheel for generating a braking/driving force while a plurality of motions are controlled. An electronic control unit identifies a slipping wheel having the maximum slip ratio ($S_i$ (i=fl, fr, rl, rr)) among wheels. The unit determines to increase or decrease a target roll moment ($K_{mx}M_x$) and a target pitch moment ($K_{my}M_y$) for controlling a roll motion and a pitch motion, which are motions on the body in the vehicle vertical direction, so that the driving force on the slipping wheel has a direction to eliminate the slip state. The unit executes driving force distribution control so that a target longitudinal driving force (Fx) and a target yaw moment ($M_z$) for respectively controlling a longitudinal motion of a vehicle (Ve) and a yaw motion of a body (Bo), which are motions in vehicle longitudinal and lateral directions, and the increased/decreased moments ($K_{mx}M_x$, $K_{my}M_y$) so as to simultaneous realize those factors.

8 Claims, 3 Drawing Sheets

(51) Int. Cl.
*B60W 10/192* (2012.01)
*B60W 10/22* (2006.01)
*B60L 15/20* (2006.01)
*B60W 10/184* (2012.01)
*B60W 30/045* (2012.01)
*B60W 30/18* (2012.01)
*B60L 3/10* (2006.01)
*B60L 7/00* (2006.01)
*B60K 7/00* (2006.01)
*B60W 50/00* (2006.01)

(52) U.S. Cl.
CPC ............ *B60L 15/20* (2013.01); *B60L 15/2009* (2013.01); *B60W 10/08* (2013.01); *B60W 10/184* (2013.01); *B60W 10/192* (2013.01); *B60W 10/22* (2013.01); *B60W 30/045* (2013.01); *B60W 30/18172* (2013.01); *B60K 7/0007* (2013.01); *B60L 2220/46* (2013.01); *B60W 2030/043* (2013.01); *B60W 2050/0024* (2013.01); *B60W 2520/26* (2013.01); *B60W 2710/083* (2013.01); *B60W 2710/182* (2013.01); *B60W 2720/14* (2013.01); *B60W 2720/16* (2013.01); *B60W 2720/18* (2013.01); *B60W 2720/30* (2013.01); *Y02T 10/645* (2013.01); *Y02T 10/72* (2013.01); *Y02T 10/7275* (2013.01)

(56) References Cited

FOREIGN PATENT DOCUMENTS

| | | |
|---|---|---|
| JP | 2009-143310 A | 7/2009 |
| JP | 2009-273274 A | 11/2009 |
| JP | 2012-086712 A | 5/2012 |

* cited by examiner

VEHICLE BRAKING/DRIVING FORCE CONTROL APPARATUS

CROSS-REFERENCE TO RELATED APPLICATION

This application relates to and claims the benefit of priority from Japanese Patent Application number 2013-208102, filed on Oct. 3, 2013 the entire disclosure of which is incorporated herein by reference.

BACKGROUND OF THE INVENTION

1. Field of the Invention

The present invention relates to a vehicle braking/driving force control apparatus for individually controlling a braking force or a driving force to be generated on each wheel of a vehicle.

2. Description of the Related Art

In recent years, as a form of an electric vehicle, there has been developed a vehicle of so-called in-wheel motor type including a motor arranged inside or in a neighborhood of a wheel and using the motor to directly drive the wheel. On the vehicle of in-wheel motor type, a driving force and a braking force of the vehicle can be controlled as appropriate depending on a travel condition of the vehicle by independently controlling rotation of the motor provided to each wheel (driving wheel), in other words, independently controlling power running or regeneration of each motor. There has been proposed a control apparatus for controlling a motion (behavior) generated on a vehicle and a body with use of capability of individual control of a driving force and a braking force on each driving wheel.

For example, Japanese Patent Application Laid-open No. 2012-86712 discloses a vehicle braking/driving force control apparatus capable of simultaneously controlling a plurality of behaviors (motions) generated on a vehicle. This related-art vehicle braking/driving force control apparatus calculates a target longitudinal driving force, a target roll moment, a target pitch moment, and a target yaw moment based on a driving operation state by a driver, a motion state of the vehicle, and the like. Then, the related-art vehicle braking/driving force control apparatus is configured to calculate and generate a driving force or a braking force to be distributed and generated on each wheel (each driving wheel) so as to simultaneously realize the calculated target longitudinal driving force, target roll moment, target pitch moment, and target yaw moment.

In this way, the related-art vehicle braking/driving force control apparatus can generate the driving force or the braking force distributed so as to simultaneously realize the target longitudinal driving force, the target roll moment, the target pitch moment, and the target yaw moment on each wheel (each driving wheel) to control the vehicle to appropriately travel, and can apply a reaction force generated by the driving force or the braking force on each suspension mechanism to a body, thereby, for example, simultaneously controlling a roll behavior, a pitch behavior, or a yaw behavior. As a result, as compared with the case of independently controlling the roll behavior, the pitch behavior, and the yaw behavior, the related-art braking/driving force control apparatus can effectively prevent the pieces of control for the respective behaviors from mutually influencing one another, and can thus control the vehicle to appropriately travel while suppressing a change in behavior of the body, thereby excellently securing ride comfort.

By the way, in the related-art vehicle braking/driving force control apparatus, each of all the wheels (all the driving wheels) generates the driving force or the braking force distributed so as to simultaneously realize the target longitudinal driving force, the target roll moment, the target pitch moment, and the target yaw moment, to thereby accelerate or decelerate the vehicle for appropriate travel while simultaneously controlling the roll behavior (roll motion), the pitch behavior (pitch motion), and the yaw behavior (yaw motion). Therefore, for example, when a slip occurs on at least one wheel among all the wheels (all the driving wheels), the driving force or the braking force distributed as described above cannot be generated on the wheel on which the slip is occurring. As a result, the target longitudinal driving force, the target roll moment, the target pitch moment, and the target yaw moment may be hard to be simultaneously realized. Thus, the attitude of the body is disturbed to decrease the ride comfort, and unintended acceleration/deceleration and a bias may occur in the vehicle.

SUMMARY OF THE INVENTION

The present invention has been made in order to deal with the above-mentioned problem, and therefore has an object to provide a vehicle braking/driving force control apparatus for securing travel stability of a vehicle by priority when a slip occurs on a wheel for generating a braking/driving force while a plurality of motions are controlled on the vehicle.

In order to achieve the above-mentioned object, a vehicle braking/driving force control apparatus according to one embodiment of the present invention includes: a braking/driving force generation mechanism for independently generating one of a driving force and a braking force on each wheel of a vehicle; a suspension mechanism for coupling the each wheel arranged at an unsprung position of the vehicle to a body arranged at a sprung position of the vehicle; and a control part for controlling the braking/driving force generation mechanism to independently generate one of the driving force and the braking force on the each wheel.

Then, the control part is configured to calculate a plurality of target motion state amounts for controlling a motion in vehicle longitudinal and lateral directions and a motion of the body in a vehicle vertical direction, and calculate one of the driving force and the braking force to be distributed to the each wheel and to be independently generated on the each wheel by the braking/driving force generation mechanism so as to realize the plurality of target motion state amounts.

One feature of the vehicle braking/driving force control apparatus according to one embodiment of the present invention resides in that the control part is configured to increase and decrease, when the control part detects a predetermined slip state on the each wheel on which one of the driving force and the braking force is generated by the braking/driving force generation mechanism, only a target motion state amount for controlling the motion of the body in the vehicle vertical direction among the plurality of target motion state amounts.

On this occasion, the motion in the vehicle longitudinal and lateral directions may be a longitudinal motion and a yaw motion for controlling the vehicle to travel, and the motion of the body in the vehicle vertical direction may be a roll motion, and a pitch motion or a heave motion. Moreover, the control part may use, based on an arrangement of the each wheel and the suspension mechanism on the vehicle, a distribution geometrically determined to realize the plurality of target motion state amounts to calculate one of the driving force and the braking force to be independently generated by the braking/driving force generation mechanism on the each wheel. Moreover, the braking/driving force generation mechanism may be a motor assembled to the each wheel of the vehicle. In this case, the control part may be configured to calculate one of a driving torque and a braking torque to be generated by the motor correspondingly to one of the driving force and the braking force calculated so as to be distributed to the each wheel to realize the plurality of target motion state amounts. Further, the braking/driving force generation mechanism may be configured to generate one of the driving force and the braking force independently for each of front left and right wheels and rear left and right wheels of the vehicle. In this case, the control part may be configured to calculate one of the driving force and the braking force distributed to each of the front left and right wheels and the rear left and right wheels and generated by the braking/driving force generation mechanism independently on each of the front left and right wheels and the rear left and right wheels so as to realize the plurality of target motion state amounts.

As a result, when the control part detects a wheel in a predetermined slip state among the wheels each on which the braking force or the driving force is generated by the braking/driving force generation mechanism (such as a motor), the control part can increase or decrease only a target motion state amount for controlling the motion of the body in the vehicle vertical direction among the plurality of target motion state amounts. In other words, when the control part detects a wheel in the predetermined slip state, the control part can increase or decrease only the target motion state amounts for controlling the motions of the body in the vehicle vertical direction, specifically, the roll motion and the pitch motion (or heave motion) closely relating to the ride comfort in order to eliminate influence caused by the occurrence of the slip state.

As a result, when the control part detects a wheel in the predetermined slip state, the control part can continue the control while the motions in the vehicle longitudinal and lateral directions, specifically, the longitudinal motion and the yaw motion for controlling the vehicle to travel, which are closely relating to the travel stability, are prevented from being influenced, in other words, without increasing or decreasing the target motion state amounts for controlling the motions in the vehicle longitudinal and lateral directions. Thus, in a situation where the motions in the vehicle longitudinal and lateral directions and the motions of the body in the vehicle vertical direction are controlled simultaneously, for example, when an occurrence of the predetermined slip state is detected, the control part can continue the control for the motions in the vehicle longitudinal and lateral direction by priority, thereby appropriately securing the travel stability or steering stability of the vehicle.

Further, in the vehicle braking/driving force control apparatus according to one embodiment of the present invention, the control part may be configured to determine a gain for increasing and decreasing the target motion state amount for controlling the motion of the body in the vehicle vertical direction depending on a slip state amount representing the predetermined slip state and a magnitude of one of the driving force and the braking force generated on a slipping wheel in the predetermined slip state. On this occasion, the control part may be configured to determine one of an increase and a decrease of the gain depending on a direction of suppressing the predetermined slip state by one of the driving force and the braking force on the slipping wheel.

Then, a magnitude of the gain may be determined so as to increase as the slip state amount increases.

As a result, the control part can use the gain that can be determined depending on the slip state amount and the magnitude of the driving force or the braking force on the slipping wheel to increase or decrease the target motion state amounts for controlling the motions of the body in the vehicle vertical direction, specifically, the roll motion and the pitch motion (or heave motion) that do not directly relate to the travel stability but closely relate to the ride comfort. In this way, the gain can be determined depending on the slip state amount and the magnitude of the driving force or the braking force on the slipping wheel, thereby appropriately reflecting the slip state to increase or decrease the target motion state amounts for controlling the motions of the body in the vehicle vertical direction. As a result, the influence caused by the occurrence of the slipping wheel can be more appropriately eliminated, and the control part can continue the control of the motions in the vehicle longitudinal and lateral directions by priority to excellently secure the travel stability or the steering stability of the vehicle.

Moreover, the control part can determine an increase or a decrease of the gain in a direction in which the driving force or the braking force suppresses (eliminates) the slip state on the slipping wheel, and can determine the magnitude of the gain so as to increase as the slip state amount increases. As a result, the control part can determine the gain so as to suppress (eliminate) the slip state with the magnitude corresponding to the slip state amount on the slipping wheel, and can use the determined gain to increase or decrease the target motion state amounts for controlling the motions of the body in the vehicle vertical direction. Thus, the control part temporarily prioritizes the control of the motions in the vehicle longitudinal and lateral directions when the slipping wheel occurs, but can quickly eliminate the slip state. Consequently, the vehicle state can quickly return to the state of controlling both of the motions in the vehicle longitudinal and lateral directions and the motions of the body in the vehicle vertical direction. In other words, the control part can suppress the influence of the motions of the body in the vehicle vertical direction caused by the occurrence of the predetermined slip state (occurrence of a slipping wheel) on the control so as to be minimized. As a result, the vehicle state can return to the state in which both the travel stability and the ride comfort of the vehicle can be secured.

DETAILED DESCRIPTION OF THE PREFERRED EMBODIMENTS

Figure 1:
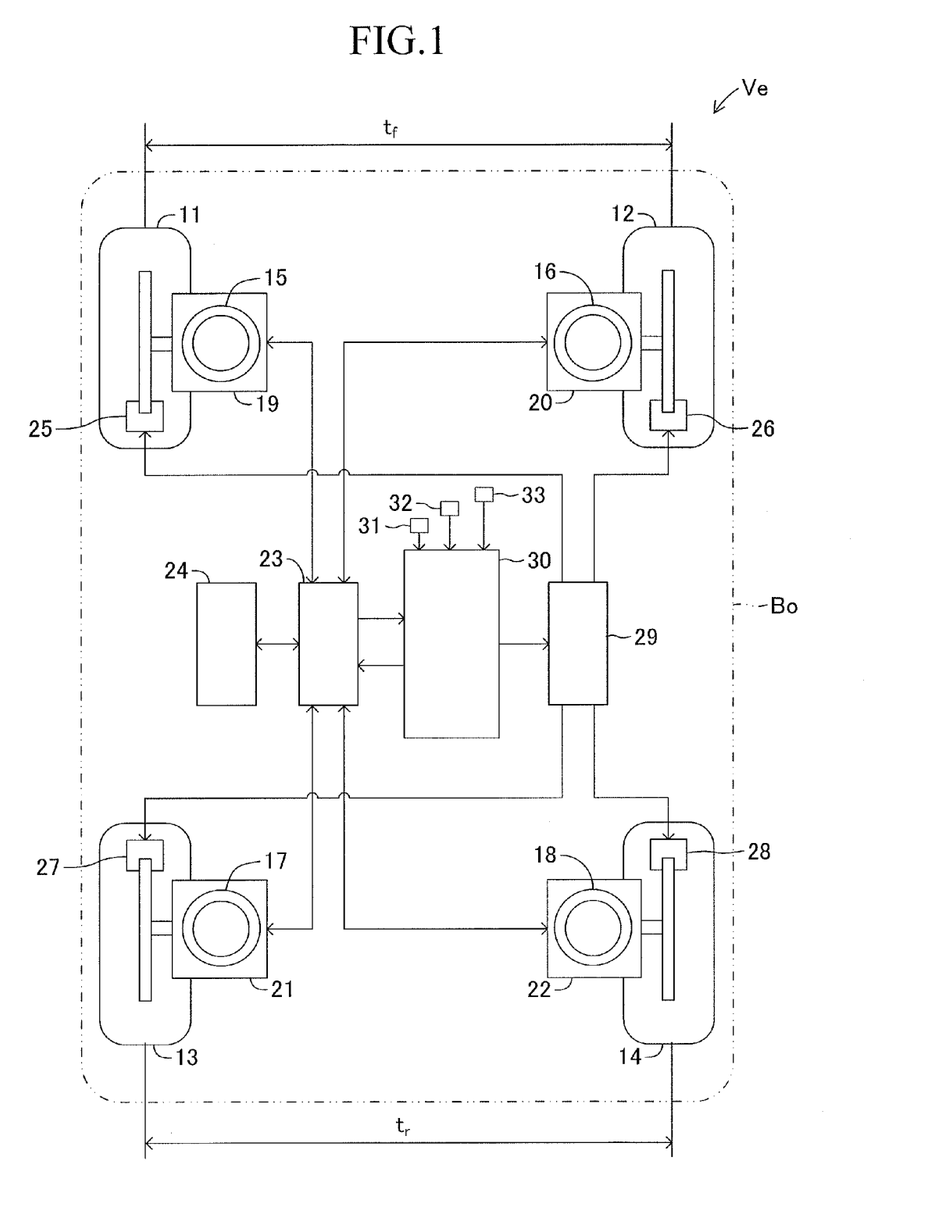
FIG. 1 is a schematic diagram schematically illustrating a configuration of a vehicle to which a vehicle braking/driving force control apparatus according to the present invention can be applied.

A detailed description is now given of an embodiment of the present invention referring to the drawings. FIG. 1 schematically illustrates a configuration of a vehicle Ve on which a vehicle braking/driving force control apparatus according to this embodiment is installed.

The vehicle Ve includes front left and right wheels 11 and 12 and rear left and right wheels 13 and 14. Then, the front left and right wheels 11 and 12 are mutually or independently supported via suspension mechanisms 15 and 16 by a body Bo serving as a sprung portion of the vehicle Ve. Moreover, the rear left and right wheels 13 and 14 are mutually or independently supported via suspension mechanisms 17 and 18 by the body Bo of the vehicle Ve.

On this occasion, configurations of the suspension mechanisms 15 to 18 do not directly relate to the present invention, and a detailed description thereof is therefore omitted. For example, a publicly known suspension such as a strut type suspension including a strut incorporating a shock absorber, a coil spring, a suspension arm, and the like, and a wishbone type suspension including a coil spring, a shock absorber, upper/lower suspension arms, and the like may be employed.

Motors 19 and 20 are respectively built into the front left and right wheels 11 and 12, and motors 21 and 22 are respectively built into the rear left and right wheels 13 and 14. The motors 19 to 22 are coupled to the front left and right wheels 11 and 12 and the rear left and right wheels 13 and 14 for transmitting rotational forces. In other words, the motors 19 to 22 are so-called in-wheel motors 19 to 22, and are respectively disposed together with the front left and right wheels 11 and 12 and the rear left and right wheels 13 and 14 at unsprung locations of the vehicle Ve. Then, driving forces and braking forces to be generated on the front left and right wheels 11 and 12 and the rear left and right wheels 13 and 14 can be independently controlled by independently controlling rotations of the respective in-wheel motors 19 to 22.

Those in-wheel motors 19 to 22 are constructed by, for example, AC synchronous motors. DC electric power of an electricity storage apparatus 24 such as a battery or a capacitor is converted via an inverter 23 to AC electric power, and the AC electric power is supplied to the respective in-wheel motors 19 to 22, thereby driving (in other words, power running) the respective in-wheel motors 19 to 22 to apply driving torques to the front left and right wheels 11 and 12 and the rear left and right wheels 13 and 14. Moreover, regeneration control may be performed on the respective in-wheel motors 19 to 22 by using rotational energy of the front left and right wheels 11 and 12 and the rear left and right wheels 13 and 14. In other words, when the respective in-wheel motors 19 to 22 are used for the electric power regeneration/generation, the rotational (kinetic) energy of the front left and right wheels 11 and 12 and the rear left and right wheels 13 and 14 is converted by the respective in-wheel motors 19 to 22 into electric energy, and electric power generated as a result of the conversion is stored via the inverter 23 in the electricity storage apparatus 24. On this occasion, braking torques based on the generated/regenerated electric power are applied to the front left and right wheels 11 and 12 and the rear left and right wheels 13 and 14. Thus, the respective in-wheel motors 19 to 22, the inverter 23, and the electricity storage apparatus 24 serve as a braking/driving force generation mechanism according to this invention.

Moreover, brake mechanisms 25, 26, 27, and 28 are respectively installed between the respective wheels 11 to 14 and the respective in-wheel motors 19 to 22 corresponding thereto. Each of the brake mechanisms 25 to 28 is, for example, a publicly known friction braking apparatus such as a disk brake and a drum brake. Each of the brake mechanisms 25 to 28 is, for example, connected to a brake actuator 29 for operating a piston of a brake caliper and a brake shoe (both are not shown) for generating the braking force on each of the wheels 11 to 14 by means of a hydraulic pressure pumped from a master cylinder (not shown).

The inverter 23 and the brake actuator 29 are each connected to an electronic control unit 30 for controlling the rotational states of the respective in-wheel motors 19 to 22, the operation states of the respective brake mechanisms 25 to 28, and the like. Thus, the electronic control unit 30 serves as control means according to the present invention.

The electronic control unit 30 has a microcomputer constructed of a CPU, a ROM, a RAM, and the like as a main component, and executes various programs including a program to be described later. Therefore, respective signals from various sensors including an operation state detection sensor 31 for detecting a state of an operation by a driver for traveling the vehicle Ve, a motion state detection sensor 32 for detecting a motion state generated on the body Bo (sprung mass) of the traveling vehicle Ve, and a disturbance detection sensor 33 for detecting disturbance acting on the traveling vehicle Ve, and signals from the inverter 23 are input to the electronic control unit 30. Note that, the operation state detection sensor 31, the motion state detection sensor 32, and the disturbance detection sensor 33 serve as a control part according to the present invention.

On this occasion, the operation state detection sensor 31 is constructed of, for example, a steering angle sensor for detecting an operation amount (steering angle) by the driver on a steering wheel (not shown), an accelerator sensor for detecting operation amounts (such as a depressed amount, an angle, and a pressure) by the driver on an accelerator pedal (not shown), a brake sensor for detecting operation amounts (such as a depressed amount, an angle, and a pressure) by the driver on a brake pedal (not shown), and the like. The motion state detection sensor 32 is constructed of, for example, a sprung vertical acceleration sensor for detecting a vertical acceleration of the body Bo (sprung mass) in the vertical direction, a lateral acceleration sensor for detecting a lateral acceleration of the body Bo in the lateral direction, a vehicle speed sensor for detecting a vehicle speed of the body Bo (vehicle Ve), a wheel speed sensor for detecting a wheel speed of each of the wheels 11 to 14, a yaw rate sensor for detecting a yaw rate generated on the body Bo (vehicle Ve), a pitch rate sensor for detecting a pitch rate generated on the body Bo (vehicle Ve), a roll rate sensor for detecting a roll rate generated on the body Bo (vehicle Ve), and the like. Further, the disturbance detection sensor 33 is constructed of, for example, stroke sensors each for detecting a stroke amount of each of the suspension mechanisms 15 to 18, unsprung vertical acceleration sensors each for detecting a vertical acceleration in the vertical direction of the unsprung mass of the vehicle Ve including each of the wheels 11 to 14, and the like.

The sensors 31 to 33 and the inverter 23 are connected to the electronic control unit 30 and the respective signals are input thereto in this way, and the electronic control unit 30 can thus recognize and control the travel state (longitudinal motion) of the vehicle Ve and the motion of the body Bo.

A specific description is first given of the control of the travel state of the vehicle Ve. Based on the signals input from the operation state detection sensor 30, for example, when the driver is operating to depress the accelerator pedal, the electronic control unit 30 can calculate required driving forces corresponding to the accelerator operation amount caused by the operation, namely, longitudinal driving forces that need to be generated by the respective in-wheel motors 19 to 22 in order to travel the vehicle Ve. Moreover, based on the signals input from the operation state detection sensor 31, for example, when the driver is operating to release the accelerator pedal or to depress the brake pedal, the electronic control unit 30 can calculate required braking forces corresponding to the brake operation amount caused by the operation, namely, braking forces that need to be generated by cooperation of the respective in-wheel motors 19 to 22 and the respective brake mechanisms 25 to 28 in order to decelerate the vehicle Ve. Then, based on the signals input from the inverter 23, specifically, signals indicating electric energies and current values supplied to the respective in-wheel motors 19 to 22 during the power running control and signals indicating electric energies and current values regenerated from the respective in-wheel motors 19 to 22 during the regeneration control, the electronic control unit 30 controls the respective in-wheel motors 19 to 22 to generate output torques (driving torques) corresponding to the required driving forces, and controls the respective in-wheel motors 19 to 22 to generate output torques (braking torques) corresponding to the required braking forces.

In this manner, the electronic control unit 30 can output signals for performing the power running control or the regeneration control on the rotations of the respective in-wheel motors 19 to 22 via the inverter 23 and signals for respectively controlling the operations of the respective brake mechanisms 25 to 28 via the brake actuator 29. Thus, the electronic control unit 30 calculates the required driving force and the required braking force required for the vehicle Ve based on the input signals from at least the operation state detection sensor 31, and outputs the signals for respectively controlling the power running/regeneration states of the respective in-wheel motors 19 to 22 and the operations of the brake actuator 29, namely, the respective brake mechanisms 25 to 28 so as to generate the required driving force and the required braking force, thereby controlling the travel state of the vehicle Ve.

On the other hand, the electronic control unit 30 can control the motion of the body Bo (sprung mass) based on the signals input from the operation state detection sensor 31, the motion state detection sensor 32, and the disturbance detection sensor 33. Specifically, the electronic control unit 30 appropriately controls a distribution of positive/negative driving forces (or braking forces) generated by the respective in-wheel motors 19 to 22, thereby controlling the vehicle Ve to travel (longitudinally move) and controlling a roll motion, a pitch motion, and a yaw motion as motions generated on the body Bo (sprung mass). On this occasion, the longitudinal motion of the vehicle Ve and the yaw motion of the body Bo are motions in the vehicle longitudinal and lateral directions, and are closely relating to travel stability of the vehicle Ve, and the roll motion and the pitch motion of the body Bo are motions in the vehicle vertical direction, and are closely relating to ride comfort of the vehicle Ve. A detailed description is now given of the motion control of the body Bo.

The electronic control unit 30 inputs signals respectively from the operation state detection sensor 31, the motion state detection sensor 32, and the disturbance detection sensor 33. Then, the electronic control unit 30 acquires, for example, a steering angle of the steering wheel by the driver, an accelerator operation amount caused by an operation on the accelerator pedal, and a brake operation amount caused by an operation on the brake pedal based on the signal input from the operation state detection sensor 31. Moreover, the electronic control unit 30 acquires, for example, the vehicle speed of the body Bo (vehicle Ve), and the roll rate, the pitch rate, and the yaw rate on the body Bo based on the signal input from the motion state detection sensor 32. Further, the electronic control unit 30 acquires, for example, the size of recesses and protrusions of a surface on which the vehicle Ve is traveling and a magnitude of influence by a crosswind on the vehicle Ve based on the signal input from the disturbance detection sensor 33.

Then, the electronic control unit 30 uses various detection values acquired as described above to calculate a target longitudinal driving force $F_x$ included in a plurality of target motion state amounts for controlling the vehicle Ve to travel, and calculates a target roll moment $M_x$, a target pitch moment $M_y$, and a target yaw moment $M_z$ included in a plurality of target motion state amounts for controlling the motions generated on the body Bo. Publicly known calculation methods may be employed for the calculation of the target longitudinal driving force $F_x$, the target roll moment $M_x$, the target pitch moment $M_y$, and the target yaw moment $M_z$. A detailed description thereof is therefore omitted, but a brief description is now given.

First, regarding the target longitudinal driving force $F_x$, which is generated by the respective in-wheel motors 19 to 22 to control the vehicle Ve to travel, the electronic control unit 30 uses the respective detection values such as the accelerator operation amount, the brake operation amount, and the vehicle speed input as described above to calculate the target longitudinal driving force $F_x$ having a predetermined relationship with those respective detection values. Regarding the target roll moment $M_x$, the electronic control unit 30 uses the respective detection values such as the steering angle, the vehicle speed, the roll rate, the size of recesses and protrusions on the road surface, and the magnitude of the influence by the crosswind input as described above to calculate the target roll moment $M_x$ having a predetermined relationship with those detection values. Regarding the target pitch moment $M_y$, the electronic control unit 30 uses the respective detection values such as the accelerator operation amount, the brake operation amount, the vehicle speed, the pitch rate, and the size of the recesses and protrusions on the road surface input as described above to calculate the target pitch moment $M_y$ having a predetermined relationship with those detection values. Regarding the target yaw moment $M_z$, the electronic control unit 30 uses the respective detection values such as the steering angle, the vehicle speed, the yaw rate, and the magnitude of the influence by the crosswind input as described above to calculate the target yaw moment $M_z$ having a predetermined relationship with those detection values.

Then, the electronic control unit 30 calculates the respective driving forces to be generated by distributing the target longitudinal driving force $F_x$ calculated as described above to the respective wheels 11 to 14. Moreover, the electronic control unit 30 calculates respective driving forces to be distributed to and generated on the respective wheels 11 to 14 in order to generate the target roll moment $M_x$, the target pitch moment $M_y$, and the target yaw moment $M_z$ calculated as described above at a center of the gravity of the vehicle Ve. In other words, the electronic control unit 30 follows Equation 1 using the target longitudinal driving force $F_x$, the target roll moment $M_x$, the target pitch moment $M_y$, and the target yaw moment $M_z$ to calculate a front left driving force $F_{fl}$ on the front left wheel 11, a front right driving force $F_{fr}$ on the front right wheel 12, a rear left driving force $F_{rl}$ on the rear left wheel 13, and a rear right driving force $F_{rr}$ on the rear right wheel 14.

$$\begin{bmatrix} F_{fl} \\ F_{fr} \\ F_{rl} \\ F_{rr} \end{bmatrix} = \begin{bmatrix} 1 & 1 & 1 & 1 \\ -a_1 & a_1 & a_2 & -a_2 \\ a_3 & a_3 & a_4 & a_4 \\ -a_5 & a_5 & -a_6 & a_6 \end{bmatrix}^{-1} \cdot \begin{bmatrix} F_X \\ M_x \\ M_y \\ M_z \end{bmatrix} \quad \text{[Equation 1]}$$

Note that, $a_1$, $a_2$, $a_3$, $a_4$, $a_5$, and $a_6$ in Equation 1 are determined based on a geometrical arrangement of the respective wheels 11 to 14 and the suspension mechanisms 15 to 18 on the vehicle Ve, and can be represented, for example, by Equation 2.

$$a_1 = \frac{t_f}{2}\tan\theta_f,\ a_2 = \frac{t_r}{2}\tan\theta_r,\ a_3 = L_f\tan\theta_f, \quad \text{[Equation 2]}$$
$$a_4 = L_r\tan\theta_r,\ a_5 = \frac{t_f}{2},\ a_6 = \frac{t_r}{2}$$

Figure 2:
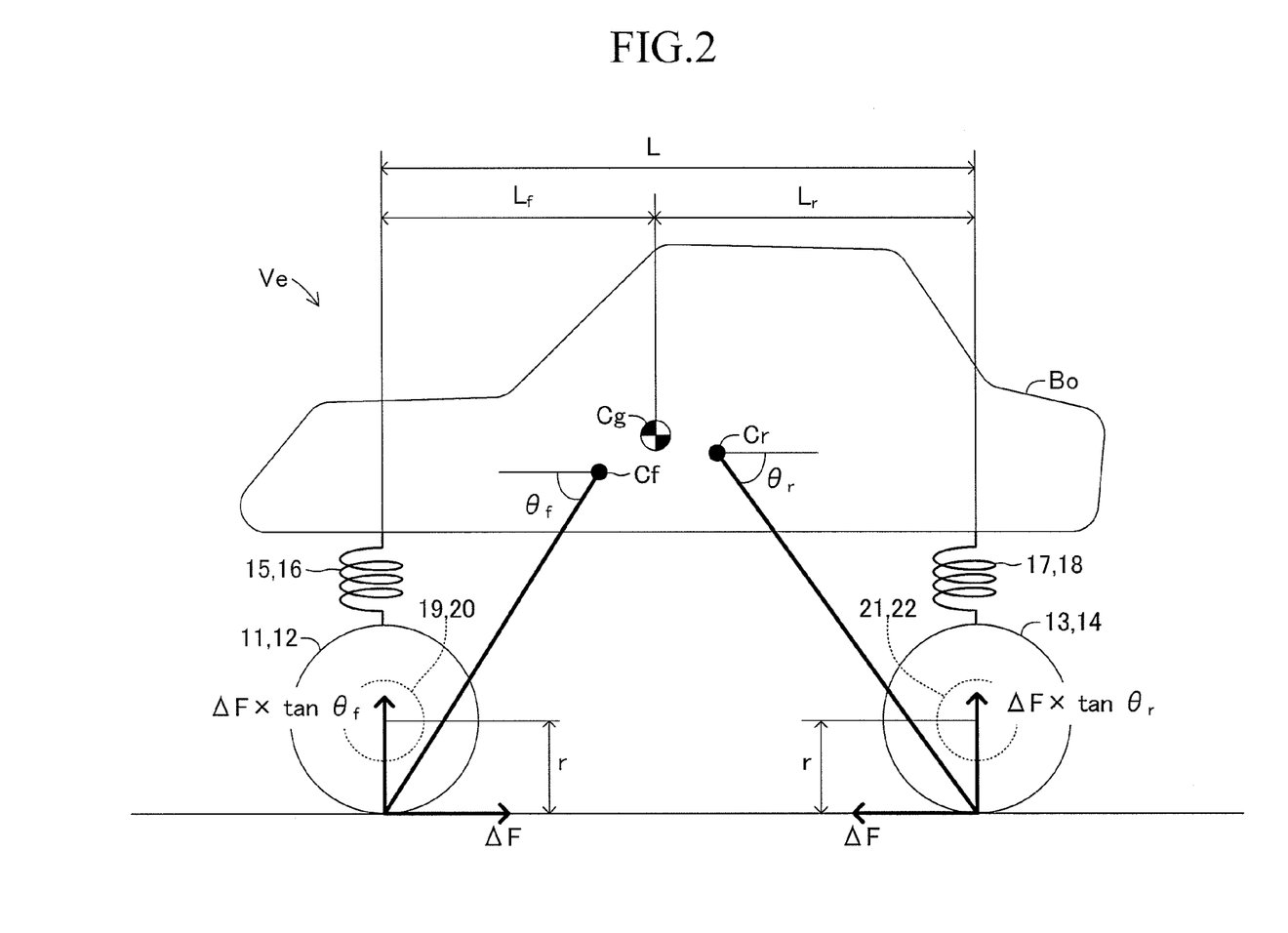
FIG. 2 is a diagram illustrating vertical forces to be input to a body when a driving force difference in a vehicle longitudinal direction occurs on the vehicle of FIG. 1.

A specific description is now given of Equations 1 and 2 referring to FIGS. 1 and 2. As schematically illustrated in FIG. 2, as the geometrical arrangement of the respective wheels 11 to 14 and the suspension mechanisms 15 to 18 of the vehicle Ve, for a wheelbase L, a distance between a center of gravity Cg of the vehicle Ve and an axle of the front left and right wheels 11 and 12 is denoted by $L_f$, and a distance between the center of gravity Cg of the vehicle Ve and an axle of the rear left and right wheels 13 and 14 is denoted by $L_r$, and, as illustrated in FIG. 1, a tread width of the front left and right wheels 11 and 12 is denoted by $t_f$ and a tread width of the rear left and right wheels 13 and 14 is denoted by $t_r$. Moreover, on the vehicle Ve having this geometrical arrangement, as illustrated in FIG. 2, an angle between a line connecting between a rotational center Cf of the suspension mechanisms 15 and 16 for the front left and right wheels 11 and 12 and ground contact points of the front left and right wheels 11 and 12 and a horizontal line is denoted by $\theta_f$ (hereinafter referred to as momentary rotational angle $\theta_f$), and an angle between a line connecting between a rotational center Cr of the suspension mechanisms 17 and 18 for the rear left and right wheels 13 and 14 and ground contact points of the rear left and right wheels 13 and 14 and the horizontal line is denoted by $\theta_r$ (hereinafter referred to as momentary rotational angle $\theta_r$).

In this case, for example, as illustrated in FIG. 2, when a driving force difference ΔF is generated in the longitudinal direction between the side of the front left and right wheels 11 and 12 and the side of the rear left and right wheels 13 and 14, component forces of the generated driving force difference ΔF, namely, vertical forces acting in the vertical direction as a reaction force of the suspension mechanisms 15 to 18 are generated. In other words, the vertical forces generated in this way can be represented as ΔF×tan $\theta_f$ by using the momentary rotational angle $\theta_f$ of the suspension mechanisms 15 and 16 on the side of the front left and right wheels 11 and 12, and can be represented as ΔF×tan $\theta_r$ by using the momentary rotational angle $\theta_r$ of the suspension mechanisms 17 and 18 on the side of the rear left and right wheels 13 and 14. Thus, when the driving force difference ΔF is generated on the respective wheels 11 to 14 to apply the vertical forces ΔF×tan $\theta_f$ and ΔF×tan $\theta_r$ input to the body Bo about the center of gravity Cg of the vehicle Ve, the acting force generated about the center of gravity Cg is geometrically determined by Equation 2 depending on the arrangement of the respective wheels 11 to 14 and the suspension mechanisms 15 to 18 of the vehicle Ve described above.

FIG. 2 exemplifies a case where the driving forces respectively generated by the rear left and right wheels 13 and 14 are larger than the driving forces respectively generated by the front left and right wheels 11 and 12, with the result that the driving force difference ΔF is generated on the side of the front left and right wheels 11 and 12 as a braking force (or a negative driving force) relatively acting backward of the vehicle Ve and the driving force difference ΔF is generated on the side of the rear left and right wheels 13 and 14 as a driving force (or a positive driving force) relatively acting forward of the vehicle Ve. Thus, it should be understood that, in contrast, when the driving forces respectively generated by the front left and right wheels 11 and 12 are larger than the driving forces respectively generated by the rear left and right wheels 13 and 14, the driving force difference ΔF is generated on the side of the front left and right wheels 11 and 12 as a driving force (or a positive driving force) relatively acting forward of the vehicle Ve and the driving force difference ΔF is generated on the side of the rear left and right wheels 13 and 14 as a braking force (or a negative driving force) relatively acting backward of the vehicle Ve.

When the vertical forces determined by Equation 2 based on the geometrical arrangement are used, the calculated target roll moment $M_x$, target pitch moment $M_y$, and target yaw moment $M_z$ about the center of gravity Cg of the vehicle Ve can be generated on the body Bo. Thus, when the front left driving force $F_{fl}$ on the front left wheel 11, the front right driving force $F_{fr}$ on the front right wheel 12, the rear left driving force $F_{rl}$ on the rear left wheel 13, and the rear right driving force $F_{rr}$ on the rear right wheel 14 calculated by Equations 1 and 2 are generated, the calculated target roll moment $M_x$, target pitch moment $M_y$, and target yaw moment $M_z$ can be simultaneously generated about the center of gravity Cg, thereby controlling the motion of the body Bo.

On this occasion, when the calculated front left driving force $F_{fl}$, front right driving force $F_{fr}$, rear left driving force $F_{rl}$, and rear right driving force $F_{rr}$ are respectively generated on the wheels 11 to 14, the electronic control unit 30 calculates the motor torques to be generated by the respective in-wheel motors 19 to 22 correspondingly to the front left driving force $F_{fl}$, the front right driving force $F_{fr}$, the rear left driving force $F_{rl}$, and the rear right driving force $F_{rr}$. In other words, the electronic control unit 30 follows Equation 3 to calculate a motor torque $T_{fl}$ to be generated by the in-wheel motor 19 correspondingly to the front left driving force $F_{fl}$, a motor torque $T_{fr}$ to be generated by the in-wheel motor 20 correspondingly to the front right driving force $F_{fr}$, a motor torque $T_{rl}$ to be generated by the in-wheel motor 21 correspondingly to the rear left driving force $F_{rl}$, and a motor torque $T_{rr}$ to be generated by the in-wheel motor 22 correspondingly to the rear right driving force $F_{rr}$.

$$\begin{bmatrix} T_{fl} \\ T_{fr} \\ T_{rl} \\ T_{rr} \end{bmatrix} = r \cdot \begin{bmatrix} F_{fl} \\ F_{fr} \\ F_{rl} \\ F_{rr} \end{bmatrix} \quad \text{[Equation 3]}$$

Note that, as illustrated in FIG. 2, r in Equation 3 represents a tire radius of the respective wheels 11 to 14 (or a gear ratio of a speed reduction mechanism (not shown)).

Then, the electronic control unit 30 outputs drive signals corresponding to the calculated motor torques $T_{fl}$, $T_{fr}$, $T_{rl}$, and $T_{rr}$ to the inverter 23. The inverter 23 controls the drive currents supplied to the respective in-wheel motors 19 to 22 to drive the respective in-wheel motors 19 to 22. As a result, the front left driving force $F_{fl}$, the front right driving force $F_{fr}$, the rear left driving force $F_{rl}$, and the rear right driving force $F_{rr}$ are generated on the respective wheels 11 to 14. Thus, the vehicle Ve can be appropriately controlled to travel (longitudinally move) depending on the operation state by the driver, and the motions on the body Bo, namely, the roll motion, the pitch motion, and the yaw motion can be simultaneously controlled.

By the way, when a slip state occurs on any one of the respective wheels 11 to 14 as a result of the generation of the positive/negative driving forces (or braking forces), the driving force (one of the front left driving force $F_{fl}$, the front right driving force $F_{fr}$, the rear left driving force $F_{rl}$, and the rear right driving force $F_{rr}$) calculated as described above cannot be generated on the wheel in the slip state. Thus, when at least one wheel generates a driving force deviated from the calculated driving force (one of the front left driving force $F_{fl}$, the front right driving force $F_{fr}$, the rear left driving force $F_{rl}$, and the rear right driving force $F_{rr}$) as a result of occurrence of the slip state, the target longitudinal driving force $F_x$, the target roll moment $M_x$, the target pitch moment $M_y$, and the target yaw moment $M_z$ of the vehicle Ve calculated as described above cannot be realized.

In other words, when the front left driving force $F_{fl}$, the front right driving force $F_{fr}$, the rear left driving force $F_{rl}$, and the rear right driving force $F_{rr}$ are controlled on the four wheels 11 to 14, the motion control of four degrees of freedom including the longitudinal motion, the roll motion, the pitch motion, and the yaw motion of the vehicle Ve can be provided. If the motion control of four degrees of freedom can be provided, when one driving force among the front left driving force $F_{fl}$, the front right driving force $F_{fr}$, the rear left driving force $F_{rl}$, and the rear right driving force $F_{rr}$ changes due to the occurrence of the slip state, as apparent from Equation 4 transformed from Equation 1, a longitudinal driving force $F_x$a, a roll moment $M_x$a, a pitch moment $M_y$a, and a yaw moment $M_z$a different from each of the target longitudinal driving force $F_x$, the target roll moment $M_x$, the target pitch moment $M_y$, and the target yaw moment $M_z$ are generated by influence of the change. As a result, an attitude of the body Bo, which is a sprung mass, may be disturbed, and unintended acceleration/deceleration and a bias of the body Bo (vehicle Ve) may occur.

$$\begin{bmatrix} F_X \\ M_x \\ M_y \\ M_z \end{bmatrix} = \begin{bmatrix} 1 & 1 & 1 & 1 \\ -a_1 & a_1 & a_2 & -a_2 \\ a_3 & a_3 & a_4 & a_4 \\ -a_5 & a_5 & -a_6 & a_6 \end{bmatrix} \cdot \begin{bmatrix} F_{fl} \\ F_{fr} \\ F_{rl} \\ F_{rr} \end{bmatrix} \quad \text{[Equation 4]}$$

Therefore, in this embodiment, when the positive/negative driving forces in the vehicle longitudinal direction are generated, and the slip state occurs on any one of the four wheels 11 to 14, the electronic control unit 30 secures the travel stability of the vehicle Ve by the highest priority. Specifically, in this embodiment, the electronic control unit 30 controls, among the longitudinal motion, the roll motion, the pitch motion, and the yaw motion of the vehicle Ve subject to the control, the longitudinal motion and the yaw motion directly affecting the travel stability (operability and controllability) by priority over the pitch motion and the roll motion mainly affecting the ride comfort. On this occasion, when the slip state occurs on any one of the four wheels 11 to 14, it is conceivable that the control for the longitudinal motion and the yaw motion is continued, and the control for one of the pitch motion and the roll motion is completely suspended. However, in this case, at least one of the pitch motion and the roll motion is not controlled, and hence motion performance of the vehicle Ve decreases. Further, when the control for one of the pitch motion and the roll motion is suspended, and, for example, the longitudinal motion is appropriately maintained, the directions of the longitudinal driving forces on the respective wheels 11 to 14 cannot be changed. When the longitudinal driving forces are redistributed as a result of such a state that one of the pitch motion and the roll motion is not controlled, the occurring slip state may be promoted.

Thus, the electronic control unit 30 controls the longitudinal motion and the yaw motion of the vehicle Ve by priority based on the target longitudinal driving force $F_x$ and the target yaw moment $M_z$ calculated as described above, and controls the roll motion and the pitch motion by multiplying the target roll moment $M_x$ and the target pitch moment $M_y$ by control gains, which are increased or decreased as described later. The use of the increasing/decreasing control gains enables to secure excellent stability (controllability) of the longitudinal motion and the yaw motion of the vehicle Ve even when the slip state occurs, and the influence on the control for the roll motion and the pitch motion can be minimized. A specific description is now given of this control.

Figure 3:
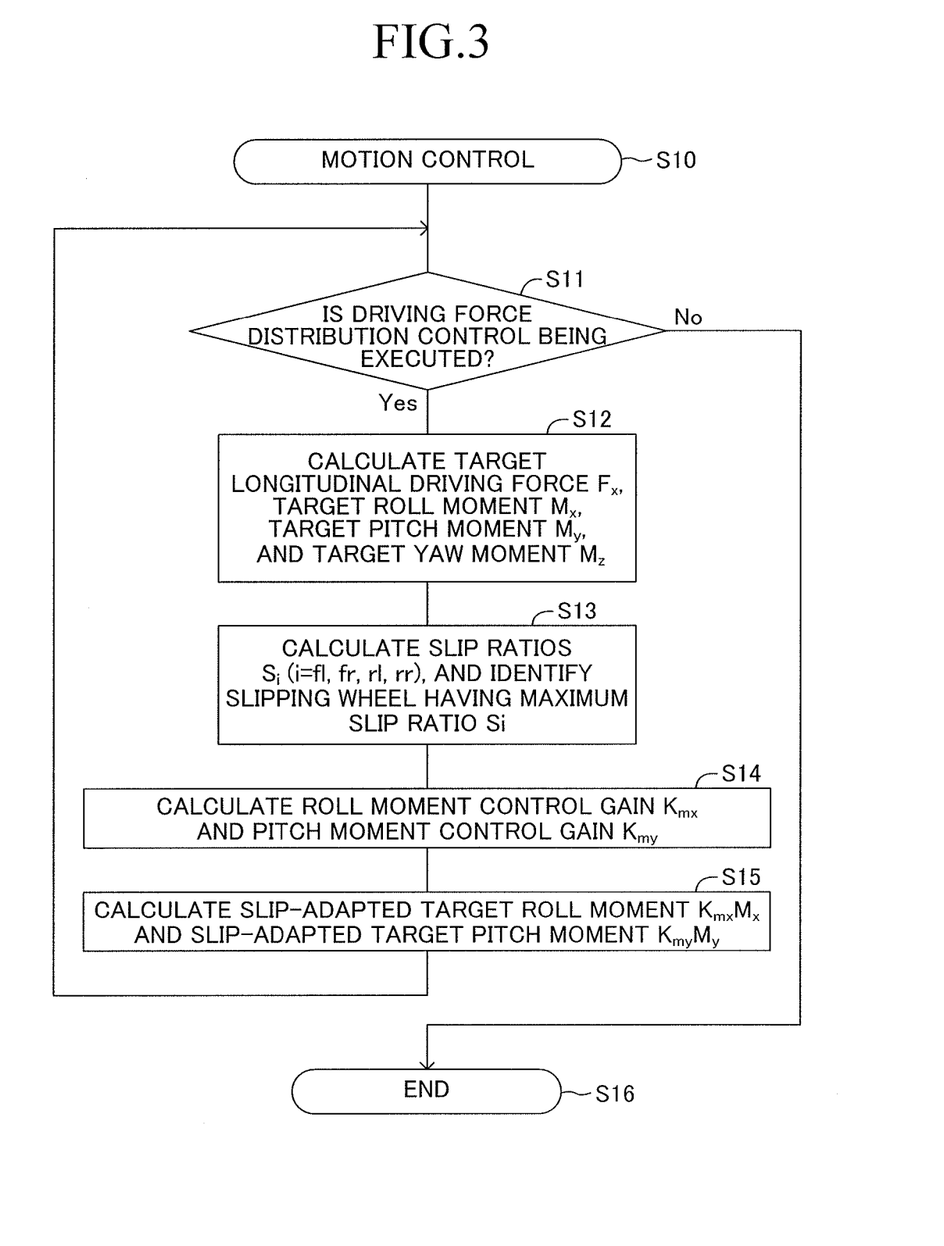
FIG. 3 is a flowchart illustrating a motion control program to be executed in an electronic control unit of FIG. 1.

In this embodiment, the electronic control unit 30 repeats a motion control program illustrated in FIG. 3 including the control for the travel state of the vehicle Ve and the motion control for the body Bo (hereinafter those pieces of control are collectively referred to as driving force distribution control) every time a predetermined short period has elapsed. Specifically, in Step S10, the electronic control unit 30 (more specifically, the CPU) starts the motion control program.

Then, in Step S11, the electronic control unit 30 determines whether or not the driving force distribution control is being executed so as to realize the target longitudinal driving force $F_x$, a slip-adapted target roll moment $K_{mx}M_x$, a slip-adapted target pitch moment $K_{my}M_y$, and the target yaw moment $M_z$ determined through processing of steps subsequent to Step S12 to be described later. In other words, when the driving force distribution control using the front left driving force $F_{fl}$, the front right driving force $F_{fr}$, the rear left driving force $F_{rl}$, and the rear right driving force $F_{rr}$ calculated by Equation 5 acquired by assigning the target longitudinal driving force $F_x$, the slip-adapted target roll moment $K_{mx}M_x$, the slip-adapted target pitch moment $K_{my}M_y$, and the target yaw moment $M_z$ to Equation 1 is being executed, the electronic control unit 30 makes a determination "Yes", and proceeds to Step S12. During the execution of the driving force distribution control, the electronic control unit 30 outputs the drive signals corresponding to the motor torques $T_{fl}$, $T_{fr}$, $T_{rl}$, and $T_{rr}$ calculated by Equation 3 to the inverter 23, thereby generating the front left driving force $F_{fl}$, the front right driving force $F_{fr}$, the rear left driving force $F_{rl}$, and the rear right driving force $F_{rr}$ on the respective wheels 11 to 14.

$$\begin{bmatrix} F_{fl} \\ F_{fr} \\ F_{rl} \\ F_{rr} \end{bmatrix} = \begin{bmatrix} 1 & 1 & 1 & 1 \\ -a_1 & a_1 & a_2 & -a_2 \\ a_3 & a_3 & a_4 & a_4 \\ -a_5 & a_5 & -a_6 & a_6 \end{bmatrix}^{-1} \cdot \begin{bmatrix} F_X \\ K_{mx} \cdot M_x \\ K_{my} \cdot M_y \\ M_z \end{bmatrix}$$ [Equation 5]

On the other hand, when the driving force distribution control is not being executed, the electronic control unit 30 makes a determination "No", and proceeds to Step S16 to once finish the execution of this program. Then, after an elapse of the predetermined short period, in Step S10, the electronic control unit 30 starts again the execution of the motion control program.

In Step S12, the electronic control unit 30 calculates the target longitudinal driving force $F_x$, the target roll moment $M_x$, the target pitch moment $M_y$, and the target yaw moment $M_z$ depending on the state of the body Bo (vehicle Ve) that changes along with the driving force distribution control in Step S11. In other words, the electronic control unit 30 uses the respective detection values represented by the various signals input from the operation state detection sensor 31, the motion state detection sensor 32, and the disturbance detection sensor 33 to calculate the target longitudinal driving force $F_x$, the target roll moment $M_x$, the target pitch moment $M_y$, and the target yaw moment $M_z$ having the predetermined relationship with those detection values as described above. Then, after the calculation of the target longitudinal driving force $F_x$, the target roll moment $M_x$, the target pitch moment $M_y$, and the target yaw moment $M_z$, the electronic control unit 30 proceeds to Step S13.

In Step S13, the electronic control unit 30 calculates slip ratios as slip state amounts representing the slip states of the respective wheels 11 to 14 driven in the forward direction (such as a positive driving force) or the backward direction (such as a negative driving force) of the vehicle Ve by the driving force distribution control in Step S11. Then, the electronic control unit 30 selects, from among the calculated slip ratios (absolute values) of the respective wheels 11 to 14, a wheel that has the maximum slip ratio (absolute value) and is in the predetermined slip state, namely, a slipping wheel. A detailed description is now given of this step processing. In the following description, the slip ratios of the respective wheels 11 to 14 are denoted by slip ratios $S_i$ (i=fl, fr, rl, rr), the vehicle speed of the vehicle Ve is denoted by V, and wheel speeds of the respective wheels 11 to 14 are denoted by wheel speeds $W_i$ (i=fl, fr, rl, rr).

First, the electronic control unit 30 calculates the respective slip ratios $S_i$ (i=fl, fr, rl, rr) of the respective wheels 11 to 14 by Equation 6, which uses the vehicle speed V and the respective wheel speeds $W_i$ (i=fl, fr, rl, rr).

$$S_i = \frac{(V - W_i)}{V}$$ [Equation 6]

Then, the electronic control unit 30 compares absolute values of the respective slip ratios $S_i$ (i=fl, fr, rl, rr) calculated by Equation 6 with one another to select the maximum slip ratio $S_i$ (i=fl, fr, rl, rr), and identifies a slipping wheel corresponding to the selected slip ratio $S_i$ (i=fl, fr, rl, rr) among the wheels 11 to 14. Then, after the selection of the maximum slip ratio $S_i$ (i=fl, fr, rl, rr) and the identification (detection) of the slipping wheel in the predetermined slip state, the electronic control unit 30 proceeds to Step S14.

In Step S14, the electronic control unit 30 calculates a roll moment control gain $K_{mx}$ and a pitch moment control gain $K_{my}$ for multiplying the target roll moment $M_x$ and the target pitch moment $M_y$ calculated in Step S12 for respectively determining a slip-adapted target roll moment $K_{mx}M_x$ and a slip-adapted target pitch moment $K_{my}M_y$. The roll moment control gain $K_{mx}$ and the pitch moment control gain $K_{my}$ are calculated by Equations 7 and 8, which use the slip ratio $S_i$ (i=fl, fr, rl, rr) of the slipping wheel identified in Step S13. The roll moment control gain $K_{mx}$ and the pitch moment control gain $K_{my}$ are initially set to "1" representing that the slip ratio $S_i$ (i=fl, fr, rl, rr) is "0" (state where the slip is not occurring).

$$K_{mx} = 1 - k\frac{S_i}{\frac{\partial F_i}{\partial M_x}}$$ [Equation 7]

$$K_{my} = 1 - k\frac{S_i}{\frac{\partial F_i}{\partial M_y}}$$ [Equation 8]

Note that, $F_i$ (i=fl, fr, rl, rr) in Equations 7 and 8 represents a positive/negative driving force on the slipping wheel. On this occasion, the driving force $F_i$ (i=fl, fr, rl, rr) is a function of the target longitudinal driving force $F_x$, the target roll moment $M_x$, the target pitch moment $M_y$, and the target yaw moment $M_z$ as apparent from Equation 4. Moreover, $M_x$ in Equation 7 represents the target roll moment calculated in Step S12, and $M_y$ in Equation 8 represents the target pitch moment calculated in Step S12. Further, k in Equations 7 and 8 represents an increasing/decreasing gain for determining control amounts (change amounts) based on the roll moment control gain $K_{mx}$ and the pitch moment control gain $K_{my}$, and is a constant or a function of the slip ratio $S_i$ (i=fl, fr, rl, rr). If the increasing/decreasing gain k is set as a function of the slip ratio $S_i$ (i=fl, fr, rl, rr), the increasing/decreasing gain k may be set so as to increase as the slip ratio $S_i$ (i=fl, fr, rl, rr) increases.

The roll moment control gain $K_{mx}$ and the pitch moment control gain $K_{my}$ are calculated by using the slip ratio $S_i$ (i=fl, fr, rl, rr) of the slipping wheel in this way. Therefore, the change amounts (increasing/decreasing amounts) of the roll moment control gain $K_{mx}$ and the pitch moment control gain $K_{my}$ increase as the slip ratio $S_i$ (i=fl, fr, rl, rr) of the slipping wheel increases as apparent from Equations 7 and 8. Moreover, whether to increase or decrease the roll moment control gain $K_{mx}$ and the pitch moment control gain $K_{my}$ is determined depending on a direction in which the driving force $F_i$ (i=fl, fr, rl, rr) on the slipping wheel suppresses the slip (a direction in which the slip ratio $S_i$ (i=fl, fr, rl, rr) decreases).

A description is now given of a specific example. When the driver is depressing the accelerator pedal to accelerate the vehicle Ve, such a pitch motion that a front portion of the body Bo rises and a rear portion falls occurs. When this pitch motion is to be suppressed, the front left driving force $F_{fl}$ and the front right driving force $F_{fr}$ of the front left and right wheels 11 and 12 are increased so as to be relatively larger than the rear left driving force $F_{rl}$ and the rear right driving force $F_{rr}$ of the rear left and right wheels 13 and 14, and the rear left driving force $F_{rl}$ and the rear right driving force $F_{rr}$ are increased. As a result, the reaction forces (vertical forces) are generated by the suspension mechanisms 15 to 18, and the front portion of the body Bo falls but the rear portion rises, with the result that the pitch motion is controlled to be suppressed. On this occasion, for example, when a slip ratio $S_{fl}$ is large and the front left wheel 13 is a slipping wheel, the positive front left driving force $F_{fl}$ (more specifically, a pitch suppressing component of the front left driving force $F_{fl}$) is decreased toward the negative direction in order to suppress the slip state of the front left wheel 13. As a result, the pitch moment control gain $K_{my}$ is determined so as to increase in accordance with Equation 7.

On the other hand, when the driver releases the accelerator pedal and the vehicle Ve is not accelerating, such a pitch motion that the front portion of the body Bo falls and the rear portion rises occurs. When this pitch motion is to be suppressed, the front left driving force $F_{fl}$ and the front right driving force $F_{fr}$ of the front left and right wheels 11 and 12 are decreased so as to be relatively smaller than the rear left driving force $F_{rl}$ and the rear right driving force $F_{rr}$ of the rear left and right wheels 13 and 14, and the rear left driving force $F_{rl}$ and the rear right driving force $F_{rr}$ are decreased. As a result, the reaction forces (vertical forces) are generated by the suspension mechanisms 15 to 18, and the front portion of the body Bo rises but the rear portion falls, with the result that the pitch motion is controlled to be suppressed. On this occasion, for example, when the slip ratio $S_{fl}$ is large and the front left wheel 13 is a slipping wheel, the negative front left driving force $F_{fl}$ (more specifically, the pitch suppressing component of the front left driving force $F_{fl}$) is increased toward the positive direction in order to suppress the slip of the front left wheel 13. As a result, the pitch moment control gain $K_{my}$ is determined so as to decrease in accordance with Equation 7.

After the electronic control unit 30 calculates the roll moment control gain $K_{mx}$ and the pitch moment control gain $K_{my}$ in this way, the electronic control unit 30 proceeds to Step S15.

In Step S15, the electronic control unit 30 multiplies the target roll moment $M_x$ calculated in Step S12 by the roll moment control gain $K_{mx}$ calculated in Step S14 to calculate the slip-adapted target roll moment $K_{mx}M_x$. Moreover, the electronic control unit 30 multiplies the target pitch moment $M_y$ calculated in Step S12 by the pitch moment control gain $K_{my}$ calculated in Step S14 to calculate the slip-adapted target pitch moment $K_{my}M_y$. In other words, the electronic control unit 30 increases/decreases only the target roll moment $M_x$ and the target pitch moment $M_y$ calculated in Step S12, and maintains the target longitudinal driving force $F_x$ and the target yaw moment $M_z$ calculated in Step S12.

After the calculation of the slip-adapted target roll moment $K_{mx}M_x$ and the slip-adapted target pitch moment $K_{my}M_y$ in this way in Step S15, the electronic control unit 30 returns to Step S11. Then, the electronic control unit 30 repeats the execution of the motion control program every time the predetermined short period has elapsed.

As appreciated from the above description, according to this embodiment, when the electronic control unit 30 detects the slipping wheel that has the maximum slip ratio $S_i$ (i=fl, fr, rl, rr) and is in the predetermined slip state, the electronic control unit 30 can calculate the slip-adapted target roll moment $K_{mx}M_x$ and the slip-adapted target pitch moment $K_{my}M_y$, thereby increasing or decreasing only the target roll moment $M_x$ and the target pitch moment $M_y$, which do not directly relate to the travel stability of the vehicle Ve but closely relate to the ride comfort. As a result, the electronic control unit 30 can prevent the occurrence of the slipping wheel from influencing the longitudinal motion and the yaw motion closely relating to the travel stability of the vehicle Ve, more specifically, can continue the control without increasing or decreasing the target longitudinal driving force $F_x$ and the target yaw moment $M_z$. Thus, in a situation where the electronic control unit 30 is simultaneously controlling the longitudinal motion of the vehicle Ve and the yaw motion of the body Bo, and the roll motion and the pitch motion of the body Bo, when an occurrence of the slipping wheel is detected, the electronic control unit 30 can continue the control for the longitudinal motion of the vehicle Ve and the yaw motion of the body Bo by priority, resulting in excellently securing the travel stability or the steering stability of the vehicle Ve.

Moreover, the electronic control unit 30 can calculate and determine the roll moment control gain $K_{mx}$ and the pitch moment control gain $K_{my}$ depending on the magnitudes of the slip ratio $S_i$ (i=fl, fr, rl, rr) and the driving force $F_i$ (i=fl, fr, rl, rr) on the slipping wheel, thereby increasing or decreasing the slip-adapted target roll moment $K_{mx}M_x$ and the slip-adapted target pitch moment $K_{my}M_y$ appropriately reflecting the slip state. As a result, the influence caused by the occurrence of the slipping wheel can be more appropriately eliminated, and the electronic control unit 30 can continue the control for the longitudinal motion and the yaw motion of the vehicle Ve by priority to excellently secure the travel stability or the steering stability of the vehicle.

Further, the electronic control unit 30 can determine an increase or a decrease of the roll moment control gain $K_{mx}$ and the pitch moment control gain $K_{my}$ depending on the direction of suppressing (eliminating) the slip state by the driving force $F_i$ (i=fl, fr, rl, rr) on the slipping wheel as represented by Equations 7 and 8, and can further determine the magnitudes of the roll moment control gain $K_{mx}$ and the pitch moment control gain $K_{my}$ so as to be increased by the increasing/decreasing gain k as the slip ratio $S_i$ (i=fl, fr, rl, rr) increases. As a result, the electronic control unit 30 can determine the roll moment control gain $K_{mx}$ and the pitch moment control gain $K_{my}$ so as to have magnitudes depending on the slip ratio $S_i$ (i=fl, fr, rl, rr) on the slipping wheel, thereby suppressing (eliminating) the slip state, with the result that the slip-adapted target roll moment $K_{mx}M_x$ and the slip-adapted target pitch moment $K_{my}M_y$ can be increased or decreased. Thus, the electronic control unit 30 temporarily prioritizes the control for the longitudinal motion of the vehicle Ve and the yaw motion of the body Bo when the slipping wheel occurs, but can quickly eliminate the slip state. Consequently, the vehicle state can quickly return to the state of controlling both the longitudinal motion of the vehicle Ve and the yaw motion of the body Bo, and the roll motion and the pitch motion of the body Bo. In other words, the electronic control unit 30 can suppress the influence on the control for the roll motion and the pitch motion caused by the occurrence of the predetermined slip state (occurrence of a slipping wheel) so as to be minimized. As a result, the vehicle state can quickly return to the state in which both the travel stability and the ride comfort of the vehicle Ve can be secured.

In carrying out the present invention, the present invention is not limited to the above-mentioned embodiment and various modifications can be made thereto without departing from the object of the present invention.

For example, according to the embodiment, the electronic control unit 30 calculates both the roll moment control gain $K_{mx}$ and the pitch moment control gain $K_{my}$ by Equations 7 and 8, and calculates both the slip-adapted target roll moment $K_{mx}M_x$ and the slip-adapted target pitch moment $K_{my}M_y$. In this case, as necessary, one of the roll moment control gain $K_{mx}$ and the pitch moment control gain $K_{my}$ may be calculated, and this calculated gain may be used for calculation to increase or decrease one of the slip-adapted target roll moment $K_{mx}M_x$ and the slip-adapted target pitch moment $K_{my}M_y$. In this case, the calculated gain may be used to assign one of the slip-adapted target roll moment $K_{mx}M_x$ and the slip-adapted target pitch moment $K_{my}M_y$ to Equation 5, thereby calculating the front left driving force $F_{fl}$, the front right driving force $F_{fr}$, the rear left driving force $F_{rl}$, and the rear right driving force $F_{rr}$, resulting in the same effect as that of the embodiment.

Moreover, according to the embodiment, the pitch motion in which the front portion and the rear portion of the body displace in directions different from each other (at cycles different from each other) in the vertical direction is employed as the motion of the body in the vehicle vertical direction. In this case, a heave motion in which the front portion and the rear portion of the body displace in the same direction (at the same cycle) in the vertical direction may be employed as the motion of the body in the vehicle vertical direction. Even if the electronic control unit 30 controls the heave motion in place of the pitch motion in this way, the slip ratio $S_i$ (i=fl, fr, rl, rr) and the driving force $F_i$ (i=fl, fr, rl, rr) of the slipping wheel may be used to calculate the control gain as in Equation 7 of the embodiment, and the control gain may be used to increase or decrease target vertical forces for controlling the heave motion of the body Bo, resulting in the same effect as that of the embodiment.

Moreover, according to the embodiment, the increasing/decreasing gain k in Equations 7 and 8 is assumed as a constant or a function of the slip ratio $S_i$ (i=fl, fr, rl, rr). On this occasion, the vehicle Ve travels while the slip state is occurring between the respective wheels 11 to 14 and the road surface. Therefore, if a slip ratio $S0_i$ (i=fl, fr, rl, rr) is required for the vehicle Ve to travel, a range lower than this slip ratio $S0_i$ (i=fl, fr, rl, rr) may be set as a dead band, and the slip ratio $S_i$ (i=fl, fr, rl, rr) satisfying $0<S_i$ (i=fl, fr, rl, rr)$<S0_i$ (i=fl, fr, rl, rr) may be treated as "0". As a result, the slip ratio $S_i$ (i=fl, fr, rl, rr) is maintained to be "0" during a normal travel, in other words, in such a state that the slip ratio $S_i$ (i=fl, fr, rl, rr) is included within the range of the dead band, and both the roll moment control gain $K_{mx}$ and the pitch moment control gain $K_{my}$ are calculated as "1" as apparent from Equations 7 and 8. In other words, both the slip-adapted target roll moment $K_{mx}M_x$ and the slip-adapted target pitch moment $K_{my}M_y$ match the target roll moment $M_x$ and the target pitch moment $M_y$, and hence the longitudinal motion, the roll motion, the pitch motion, and the yaw motion of the vehicle Ve can simultaneously be controlled during the normal travel.

Moreover, according to the embodiment, the electronic control unit 30 independently controls the calculated front left driving force $F_{fl}$, front right driving force $F_{fr}$, rear left driving force $F_{rl}$, and rear right driving force $F_{rr}$. In this case, driving forces (or braking forces) to be generated on the side of the front left and right wheels 11 and 12 and on the side of the rear left and right wheels 13 and 14 may be opposite to each other, and may be the same in absolute value so as not to influence the longitudinal motion of the vehicle Ve, in other words, so as not to generate an unnecessary lower limit speed of the vehicle Ve. As a result, the driving force difference (or braking force difference) to be generated on the side of the front left and right wheels 11 and 12 and on the side of the rear left and right wheels 13 and 14 cancel each other. Consequently, the longitudinal driving forces required for the travel of the vehicle Ve can be effectively prevented from being decreased, and the same effect as that of the embodiment is expected.

Further, according to the embodiment, the electronic control unit 30 respectively calculates the front left driving force $F_{fl}$, the front right driving force $F_{fr}$, the rear left driving force $F_{rl}$, and the rear right driving force $F_{rr}$. In this case, for example, the electronic control unit 30 may calculate a driving force on the front wheel side generated in cooperation with the front left and right wheels 11 and 12, and a driving force on the rear wheel side generated in cooperation with the rear left and right wheels 13 and 14 as necessary. This configuration can provide the same effect as that of the embodiment.

What is claimed is:

1. A vehicle braking/driving force control apparatus, comprising:
    a braking/driving force generation mechanism for independently generating one of a driving force and a braking force on each wheel of a vehicle;
    a suspension mechanism for coupling the each wheel arranged at an unsprung position of the vehicle to a body arranged at a sprung position of the vehicle; and
    a control part configured to:
    calculate a plurality of target motion state amounts for controlling a motion in vehicle longitudinal and lateral directions and a motion of the body in a vehicle vertical direction;
    calculate, by using the calculated plurality of target motion state amounts, one of the driving force or the braking force to be distributed to the each wheel and to be independently generated on the each wheel by the braking/driving force generation mechanism so as to realize the calculated plurality of target motion state amounts; and
    detect whether or not a predetermined slip state is present on the each wheel,
    wherein, based upon the control part detecting a predetermined slip state on the each wheel on which one of the driving force or the braking force is generated by the braking/driving force generation mechanism, the control part is further configured to:
        increase and decrease the calculated target motion state amount for controlling the motion of the body in the vehicle vertical direction so as to suppress the predetermined slip state,
        calculate, by using the calculated target motion state amount for controlling the motion in the vehicle longitudinal and lateral directions and the increased and decreased target motion state amount for controlling the motion of the body in the vehicle vertical direction, one of the driving force or the braking force to be distributed to each wheel and to be independently generated on the each wheel by the braking/driving force generation mechanism so as to realize the calculated target motion state amount for controlling the motion in the vehicle longitudinal and lateral directions and the increased and decreased target motion state amount for controlling the motion of the body in the vehicle vertical direction, and
        control the braking/driving force generation mechanism based on the calculated one of the driving force or the braking force to independently generate one of the driving force or the braking force on the each wheel.

2. A vehicle braking/driving force control apparatus according to claim 1, wherein the control part is further configured to determine a gain for increasing and decreasing the target motion state amount for controlling the motion of the body in the vehicle vertical direction depending on a slip state amount representing the predetermined slip state and a magnitude of one of the driving force or the braking force generated on a slipping wheel in the predetermined slip state.

3. A vehicle braking/driving force control apparatus according to claim 2,
wherein the control part is further configured to determine one of an increase or a decrease of the gain depending on a direction of suppressing the predetermined slip state by one of the driving force or the braking force on the slipping wheel.

4. A vehicle braking/driving force control apparatus according to claim 3, wherein a magnitude of the gain is determined so as to increase as the slip state amount increases.

5. A vehicle braking/driving force control apparatus according to claim 2, wherein a magnitude of the gain is determined so as to increase as the slip state amount increases.

6. A vehicle braking/driving force control apparatus according to claim 1, wherein the motion in the vehicle longitudinal and lateral directions comprises a longitudinal motion and a yaw motion for controlling the vehicle to travel, and
wherein the motion of the body in the vehicle vertical direction comprises a roll motion and one of a pitch motion and a heave motion.

7. A vehicle braking/driving force control apparatus according to claim 1, wherein the control part is further configured to use, based on an arrangement of the each wheel and the suspension mechanism on the vehicle, a distribution geometrically determined to realize the plurality of target motion state amounts to calculate one of the driving force or the braking force to be independently generated by the braking/driving force generation mechanism on the each wheel.

8. A vehicle braking/driving force control apparatus according to claim 1,
wherein the braking/driving force generation mechanism comprises a motor assembled to the each wheel of the vehicle, and
wherein the control part is further configured to calculate one of a driving torque and a braking torque to be generated by the motor correspondingly to one of the driving force or the braking force calculated so as to be distributed to the each wheel to realize the plurality of target motion state amounts.

* * * * *